US008985182B2

(12) United States Patent
Fredin

(10) Patent No.: US 8,985,182 B2
(45) Date of Patent: Mar. 24, 2015

(54) FOLDABLE WELDING SCREEN

(71) Applicant: Greg Fredin, Edmonton (CA)

(72) Inventor: Greg Fredin, Edmonton (CA)

(*) Notice: Subject to any disclaimer, the term of this patent is extended or adjusted under 35 U.S.C. 154(b) by 81 days.

(21) Appl. No.: 13/744,183

(22) Filed: Jan. 17, 2013

(65) Prior Publication Data

US 2013/0180674 A1 Jul. 18, 2013

(30) Foreign Application Priority Data

Jan. 17, 2012 (CA) ................................. 2766638

(51) Int. Cl.
A47G 5/00 (2006.01)
B23K 37/00 (2006.01)
B23K 9/32 (2006.01)

(52) U.S. Cl.
CPC .............. B23K 37/006 (2013.01); B23K 9/321 (2013.01)
USPC ............................... 160/351; 160/352

(58) Field of Classification Search
CPC ....................................................... A47G 5/00
USPC ............. 160/351, 352, 377; 228/59; 451/455, 451/457; 135/133
See application file for complete search history.

(56) References Cited

U.S. PATENT DOCUMENTS

| 1,650,111 | A | * | 11/1927 | Byne | 135/133 |
| 2,142,851 | A | * | 1/1939 | Jolly | 135/132 |
| 2,325,506 | A | * | 7/1943 | Grace | 206/223 |
| 2,335,274 | A | | 11/1943 | Hampton | |
| 2,551,975 | A | * | 5/1951 | Scott | 160/56 |
| 3,190,300 | A | * | 6/1965 | Wear'n | 135/126 |
| 3,477,492 | A | | 11/1969 | Suess | |
| 4,085,789 | A | | 4/1978 | Steiner | |
| 4,116,206 | A | * | 9/1978 | Warner et al. | 135/88.13 |
| 4,134,439 | A | | 1/1979 | Scott | |
| 4,440,187 | A | * | 4/1984 | Fiddler | 135/117 |
| 4,646,770 | A | * | 3/1987 | Lobato | 135/137 |
| 4,739,784 | A | * | 4/1988 | Fast | 135/117 |

(Continued)

FOREIGN PATENT DOCUMENTS

DE 4106337 C1 5/1992

OTHER PUBLICATIONS

Govgroup, "Pilgrim 18202 Fireplace 3 Fold Screen," http://www.govgroup.com/fireplace-3-fold-screen-2160752-prd1.htm, retrieved Aug. 25, 2011.

(Continued)

Primary Examiner — Blair M Johnson
(74) Attorney, Agent, or Firm — Christensen O'Connor Johnson Kindness PLLC

(57) ABSTRACT

A foldable welding screen includes first and second elongate members each with a first end, a second end and an intermediate point. Intermediate point includes a pivoting connection with the first ends of the first and second elongate members being pivotally connected and the second ends of the first and second elongate members being pivotally connected. A stabilizing member has a first portion that is pivotally connected to the intermediate point of the first elongate member and a second portion that is pivotally connected to the intermediate point of the second elongate member. The first portion of the stabilizing member is movable relative to the second portion of the stabilizing member. A flexible substrate is attached to the first elongate member and the second elongate member. The first and second elongate members move between an erected position and a collapsed position.

2 Claims, 4 Drawing Sheets

(56) References Cited

U.S. PATENT DOCUMENTS

| | | | |
|---|---|---|---|
| 4,842,035 A | 6/1989 | Thompson | |
| 4,944,444 A | 7/1990 | Renner | |
| 5,215,109 A * | 6/1993 | Kent, Jr. | 135/137 |
| 5,842,495 A * | 12/1998 | Egnew et al. | 135/133 |
| 7,111,633 B2 | 9/2006 | Moroney | |
| 2013/0180674 A1 * | 7/2013 | Fredin | 160/351 |

OTHER PUBLICATIONS

Railroad Tools and Solutions, "Portable Welding Screen," http://www.rrtools.com/welding/LittleSparky.asp, retrieved Aug. 25, 2011.

Tillman, "Frame and Panel Options," http://jtillman.com/products/screens-curtains/frame-and-panel-options/, retrieved Aug. 25, 2011.

Tough Weld Workwear, "Portable Welding Screen," http://www.toughweld.com/products/1274-portable-welding-screen, retrieved Aug. 25, 2011.

\* cited by examiner

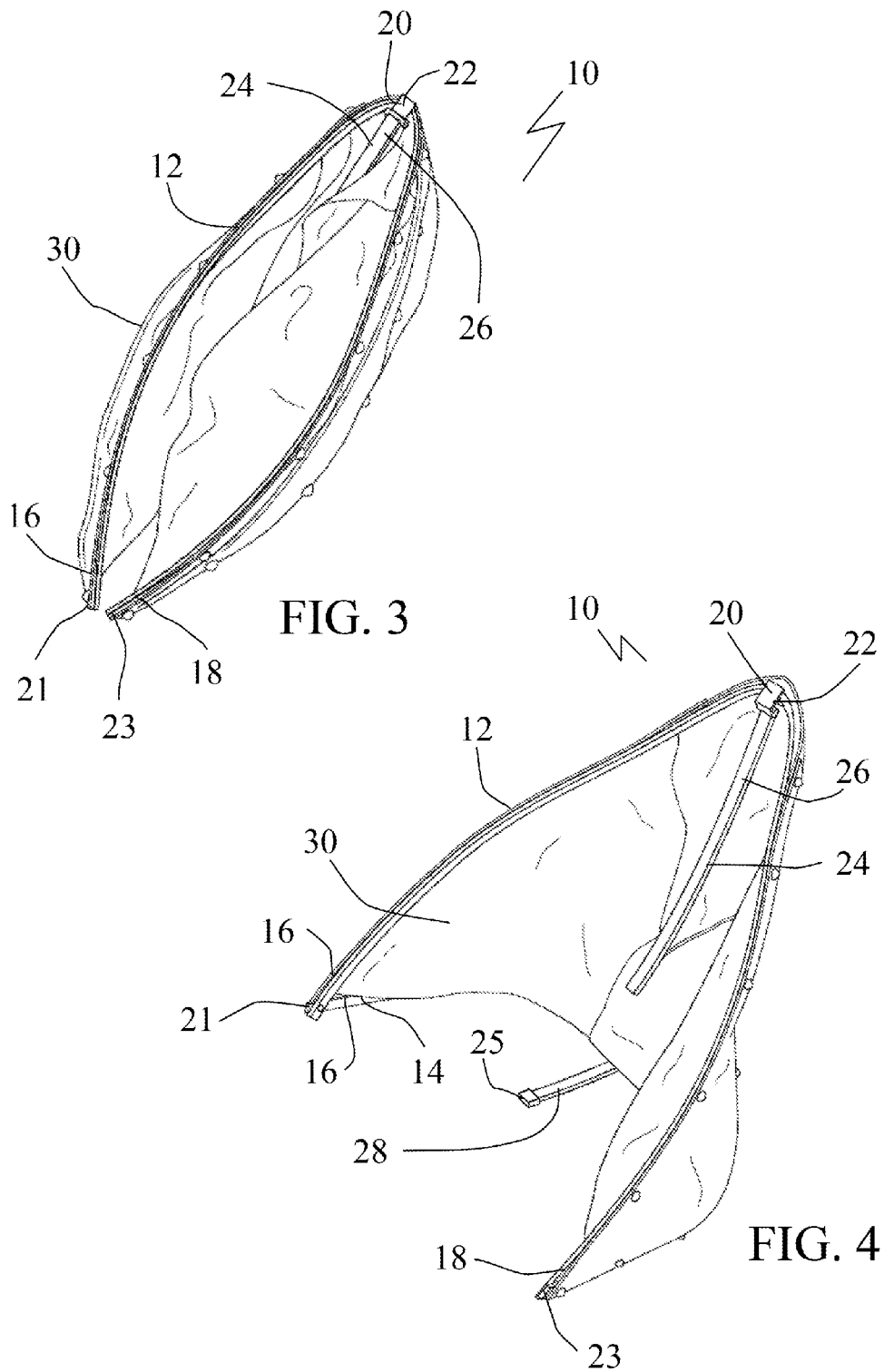

FOLDABLE WELDING SCREEN

FIELD

This relates to a foldable welding screen.

BACKGROUND

Welding operations often gives off a bright light that can cause damage to unprotected eyes. In addition, some steps generate sparks or "slag" that could cause fires or explosions in hazardous environments. Accordingly, welding screens are used to reduce the glare and acts as a spark stop.

SUMMARY

There is provided a foldable welding screen that includes first and second elongate members. Each elongate member has a first end, a second end and an intermediate point. The intermediate point has a pivoting connection with the first ends of the first and second elongate members being pivotally connected and the second ends of the first and second elongate members being pivotally connected. A stabilizing member has a first portion that is pivotally connected to the intermediate point of the first elongate member and a second portion that is pivotally connected to the intermediate point of the second elongate member. The first portion of the stabilizing member is movable relative to the second portion of the stabilizing member. A flexible substrate is attached to the first elongate member and the second elongate member. The first and second elongate members having an erected position and a collapsed position.

In the collapsed position, the first and second elongate members are folded at the respective intermediate points such that the first and second ends are adjacent. The first and second elongate members are pivoted about the first and second ends such that the intermediate points are adjacent. The first and second portions of the stabilizing member are pivoted to extend from the intermediate points of the first and second elongate members toward the first and second ends of the first and second elongate members.

In the erected position, the first and second ends of the first and second elongate members are spaced apart with the intermediate point of each first and second elongate member being non-collinear with the first and second ends. The first elongate member is pivoted about the pivotal connections at the first and second ends relative to the second elongate member such that the first elongate member extends outward from the second elongate member. The stabilizing member is engaged to support the orientation of the first elongate member relative to the second elongate member. The flexible substrate extends over the stabilizing member between the first and second elongate members to define a welding screen.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 3 is a rear perspective view of the foldable welding screen in a collapsed position.

FIG. 4 is a rear perspective view of the foldable welding screen with the stabilizing member undone.

DETAILED DESCRIPTION

Figure 1:
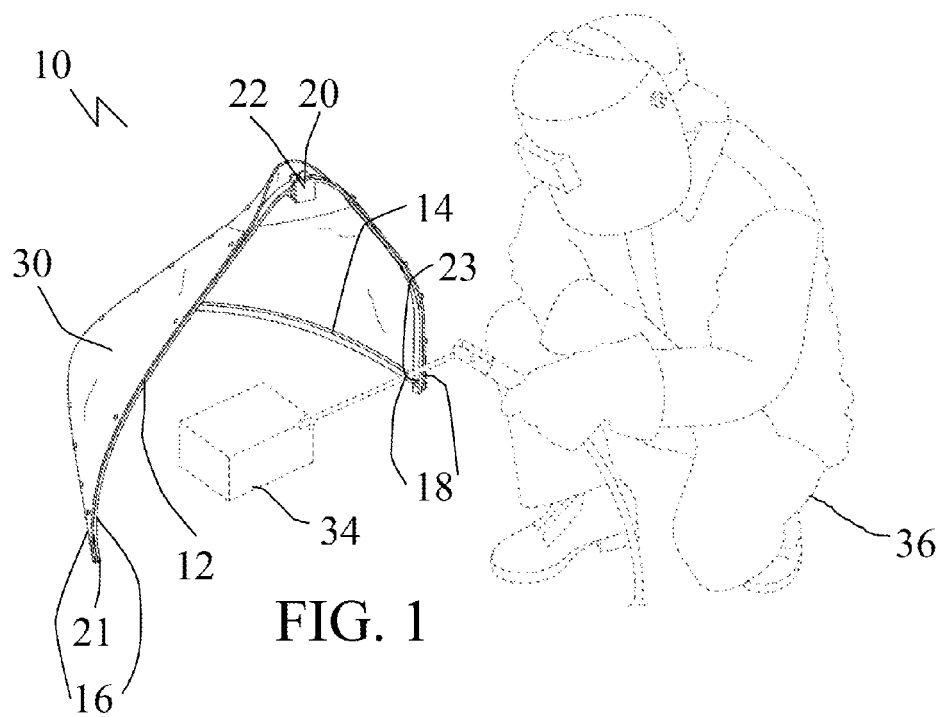
FIG. 1 is a perspective view of a foldable welding screen in use.

A foldable welding screen generally identified by reference numeral 10, will now be described with reference to FIGS. 1 through 7.

Figure 2:
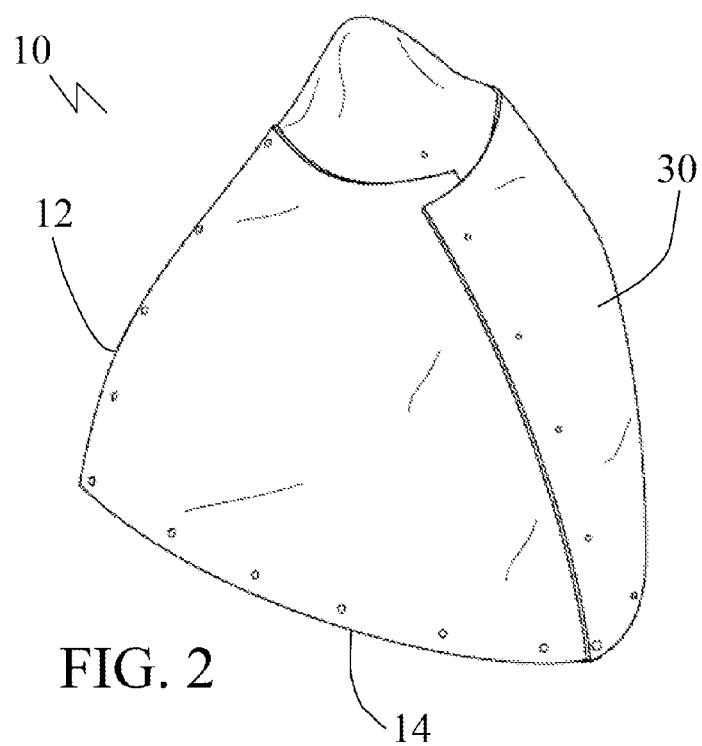
FIG. 2 is a front perspective view of the foldable welding screen shown in FIG. 1.
Figure 5:
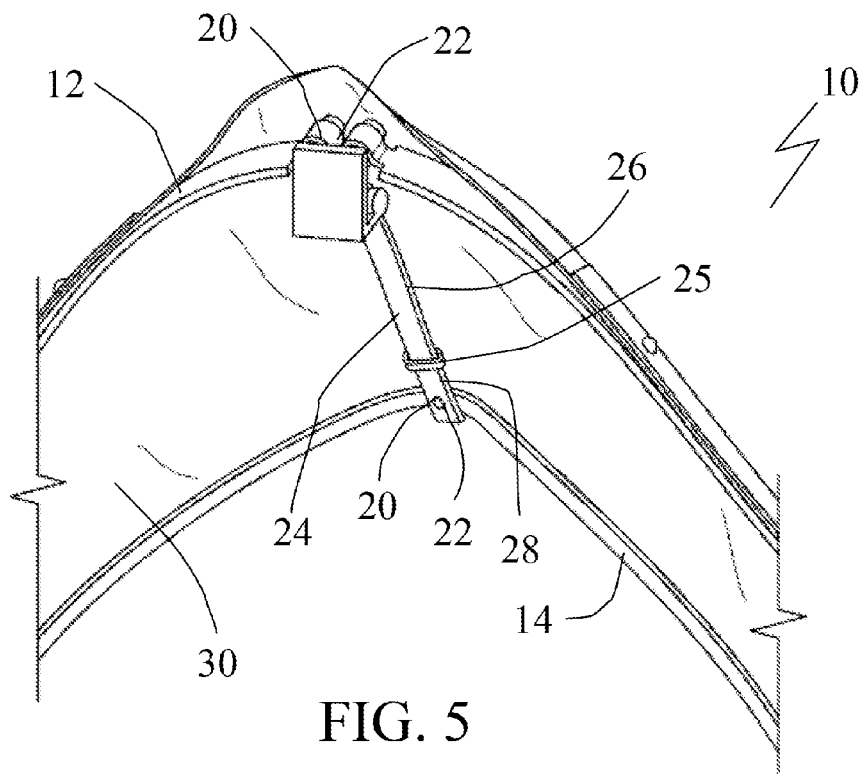
FIG. 5 is detailed view of the foldable welding screen with the stabilizing member engaged.
Figure 6:
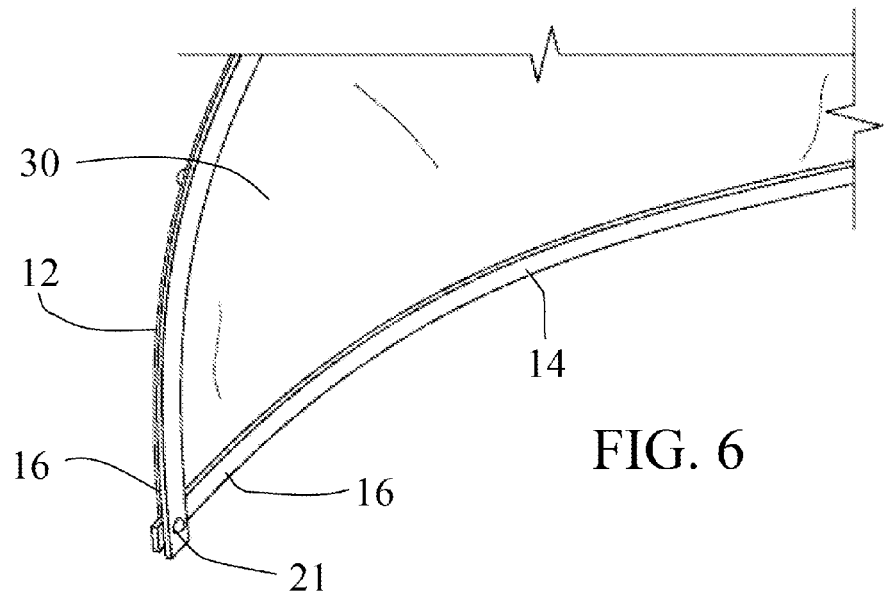
FIG. 6 is a detailed view of the connection between elongate members.
Figure 7:
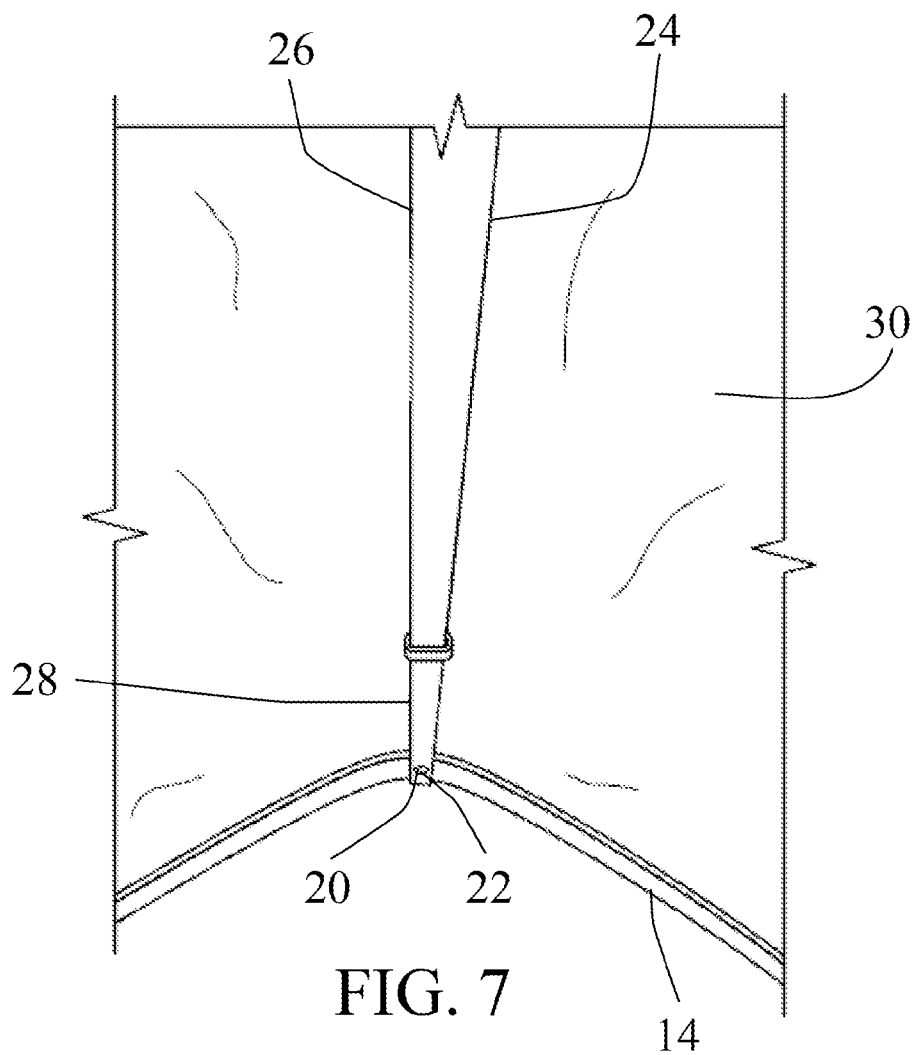
FIG. 7 is a detailed view of the engagement for the stabilizing member.

Structure and Relationship of Parts:

Referring to FIG. 1, a foldable welding screen 10 includes first elongate member 12 and second elongate member 14. Each elongate member 12 and 14 has a first end 16, a second end 18 and an intermediate point 20. Referring to FIG. 5, intermediate point 20 has a pivoting connection 22. As shown, pivoting connection 22 is a hinge-type structure that separates elongate member 12 into two parts. Each part is a hinge-type structure with a loop of material around a pin. Other types of pivoting connections known in the art may also be used rather than the depicted design. Referring to FIG. 6, first ends 16 of first and second elongate members 12 and 14 are pivotally connected at connection 21. Referring to FIG. 1, second ends 18 of first and second elongate members 12 and 14 are pivotally connected at connection 23 in the same manner. Although a simple pin connection is shown in FIG. 6, it should be understood that any type of connection that allows for pivoting between first elongate member 12 and second elongate member 14 may be used. Similarly, pivoting connection 22, which separates elongate member 12 into two parts and has a type of barrel hinge connected to each, may also be replaced with other types of pivoting connections, such as other types of hinges. In addition, the pivoting movement may be permitted by a flexible or resilient material at intermediate point 20. Generally, pivoting connection 22 may be any connection that provides sufficient structural strength to support foldable welding screen 10 in both the erect and collapsed positions, and allows movement between the two positions. Referring to FIG. 5, a stabilizing member 24 has a first portion 26 that is pivotally connected to intermediate point 20 of first elongate member 12 and, referring to FIG. 7, a second portion 28 that is pivotally connected to intermediate point 20 of second elongate member 14. As shown, the pivotal connection is another type of barrel hinge that permits movement of first and second portions 26 and 28 relative to first and second elongate members 12 and 14. Referring to FIG. 4, first portion 26 of stabilizing member 24 is movable relative to second portion 28 of stabilizing member 24. A first portion receiver 25 is present on second portion 26 and holds first portion 26 and second portion 28 of stabilizing member 24 in connection, as shown in FIG. 5, and allows for separation of first portion 26 and second portion 28, as shown in FIG. 4. It will be understood that, rather than the male/female connection shown, other connections between first portion 26 and second portion 28 of stabilizing member 24 may be used, such as a threaded connection, interlocking connection, pin connection, etc. Furthermore, first and second portions 26 and 28 may also be connected by a pivoting connection (not shown) that allow them to move, or may incorporate a telescopic connection to adjust the angle between first and second elongate members 12 and 14. The connection is preferably sufficient to maintain flexible substrate 30 taut to maintain tension in the erect position. Referring to FIG. 2, a flexible substrate 30 is attached to first elongate member 12 and second elongate member 14 and is supported in the middle by stabilizing member 24. As shown, flexible substrate 30 is riveted to first and second elongate members 12 and 14 as well as stabilizing member 24. However, it will be understood that it may be mounted in other ways, such as by removable connections (e.g., snaps, hook and look tape fasteners, etc.) that would allow flexible substrate 30 to be removed. Other permanent attachments strategies may also be used, such as plastic welding if first and second elongate members 12 and 14 and flexible substrate 30 are made from suitable materials, flexible substrate 30 may have portions that extend through holes or slots in elongate members 12 and 14, etc. Other permanent or semi-permanent connection strategies will be recognized by those skilled in the art. Preferably, elongate members 12 and 14 and stabilizing member 24 are metal for durability and flexible substrate is a PVC, fire resistant material commonly used for welding screens. Other materials that are suitable for the intended uses of screen 10 for the various components may also be used as will be recognized by those in the art.

First and second elongate members 12 and 14 are movable between an erected position, shown in FIG. 1, and a collapsed position, shown in FIG. 3. Referring to FIG. 4, to collapse welding screen 10, first portion 26 and second portion 28 of stabilizing member 24 are separated. Referring to FIG. 3, first and second elongate members 12 and 14 are folded at the respective intermediate points 20 such that first end 16 and second end 18 are adjacent, i.e., positioned close together. First and second elongate members 12 and 14 are also pivoted about first end 16 and second end 18 such that intermediate points 20 are adjacent, i.e., positioned close together. First and second portions 26, 28 of stabilizing member 24 are pivoted to extend from intermediate points 20 of first and second elongate members 12 and 14 toward first and second ends 16 and 18 of first and second elongate members 12 and 14. The collapsed position allows for easy storage and transportation of welding screen 10.

Referring to FIG. 1, in the erected position, first and second ends 16 and 18 of first and second elongate members 12 and 14 are spaced apart with intermediate point 20 of each of first and second elongate member 12 and 14 being non-collinear with first and second ends 16 and 18. As shown, first and second elongate members 12 and 14 form a generally curved shape, such as a U- or V-shape. First and second elongate members 12 and 14 are also shown as having a partial curve that, along with connections 22, permits the generally curved shape. First elongate member 12 is pivoted about pivotal connections 22 at first and second ends 16 and 18 relative to second elongate member 14 such that first elongate member 12 extends outward from second elongate member 14. Referring to FIG. 5, first portion 26 and second portion 28 of stabilizing member 24 are connected with first portion receiver 25 to support the orientation of first elongate member 12 relative to second elongate member 14. Flexible substrate 30 extends over stabilizing member 24 between first and second elongate members 12 and 14 to define welding screen 10. Second elongate member 14 forms a base on which welding screen 10 is supported, while first elongate member 12 forms an opening or work space in which a welder 32 may work. The workpiece 34 may be a discrete object as shown, or a part of a bigger object. Workpiece 34 may be placed within the opening formed by first elongate member 12 as shown, or screen 10 may be placed adjacent to workpiece 34. As shown, first and second elongate members 12 and 14 are substantially the same, such that screen 10 may be erected in any orientation. In other designs, it may be preferable to have a different design for the member that forms the base as compared to the member that form the opening, depending on the preferences of the user and the intended uses.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A foldable welding screen, comprising:
   first and second elongate members each having a first end, a second end, and an intermediate point, the intermediate point comprising a pivoting connection, wherein the pivoting connection of the intermediate point has a pivot axis extending perpendicular to the respective elongate member, the first ends of the first and second elongate members being pivotally connected at a first corner connection and the second ends of the first and second elongate members being pivotally connected at a second corner connection, each of the first and second corner connections pivoting freely about a respective pivot axis;
   a stabilizing member having a first portion that is pivotally connected to the intermediate point of the first elongate member and a second portion that is pivotally connected to the intermediate point of the second elongate member, the first portion of the stabilizing member being movable relative to the second portion of the stabilizing member;
   a flexible substrate attached to the first elongate member and the second elongate member;
   the first and second elongate members having an erected position and a collapsed position, wherein, in the collapsed position:
      the first and second elongate members are folded about the pivot axis of the pivoting connections at the respective intermediate points such that the first and second ends are adjacent;
      the first and second elongate members are pivoted about the first and second corner connections such that the intermediate points are adjacent; and
      the first and second portions of the stabilizing member are pivoted to extend from the intermediate points of the first and second elongate members toward either of the first and second ends of the first and second elongate members; and
   in the erected position:
      the first and second ends of the first and second elongate members are spaced apart with the intermediate point of each first and second elongate member being non-collinear with the first and second ends;
      the first elongate member is pivoted about the pivotal connections at the first and second ends relative to the second elongate member such that the first elongate member extends outward from the second elongate member;
      the stabilizing member portions being engaged to support the orientation of the first elongate member relative to the second elongate member; and
      the flexible substrate extending over the stabilizing member between the first and second elongate members to define a welding screen.

2. A method of erecting a welding screen, comprising the steps of:
provinding:
first and second elongate members each having a first end, a second end, and an intermediate point, the intermediate point comprising a pivoting connection, wherein the pivoting connection of the intermediate point has a pivot axis extending perpendicular to the elongate members, the first ends of the first and second elongate members being pivotally connected at a first corner connection and the second ends of the first and second elongate members being pivotally connected at a second corner connection, each of the first and second corner connections pivoting freely about a respective pivot axis;
a stabilizing member having a first portion that is pivotally connected to the intermediate point of the first elongate member and a second portion that is pivotally connected to the intermediate point of the second elongate member, the first portion of the stabilizing member being movable relative to the second portion of the stabilizing member; and
a flexible substrate attached to the first elongate member and the second elongate member;
collapsing the first and second elongate members to a collapsed position, wherein:
the first and second elongate members are folded about the pivot axis of the pivoting connections at the respective intermediate points such that the first and second ends are adjacent;
the first and second elongate members are pivoted about the first and second corner connections such that the intermediate points are adjacent; and
the first and second portions of the stabilizing member are pivoted to extend from the intermediate points of the first and second elongate members toward either of the first and second ends of the first and second elongate members; and
erecting the first and second elongate members to an erected position, wherein:
the first and second ends of the first and second elongate members are spaced apart with the intermediate point of each first and second elongate member being non-collinear with the first and second ends;
the first elongate member is pivoted about the pivotal connections at the first and second ends relative to the second elongate member such that the first elongate member extends outward from the second elongate member;
the stabilizing member portions being engaged to support the orientation of the first elongate member relative to the second elongate member;
the flexible substrate extending over the stabilizing member between the first and second elongate members to define a welding screen.

* * * * *